US011216401B2

United States Patent
Yu et al.

(10) Patent No.: US 11,216,401 B2
(45) Date of Patent: Jan. 4, 2022

(54) USB HOST-TO-USB HOST CHIP

(71) Applicant: PROLIFIC TECHNOLOGY INC., Taipei (TW)

(72) Inventors: Tien-Wei Yu, Hsinchu (TW); Cheng-Sheng Chan, Hsinchu (TW); Chiun-Shiu Chen, Hsinchu (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 0 days.

(21) Appl. No.: 16/866,705

(22) Filed: May 5, 2020

(65) Prior Publication Data
US 2020/0356508 A1 Nov. 12, 2020

(30) Foreign Application Priority Data
May 6, 2019 (TW) .................. 108115596

(51) Int. Cl.
*G06F 13/38* (2006.01)
*G06F 13/42* (2006.01)
*G06F 13/28* (2006.01)
*G06F 13/40* (2006.01)

(52) U.S. Cl.
CPC ............ *G06F 13/385* (2013.01); *G06F 13/28* (2013.01); *G06F 13/405* (2013.01); *G06F 13/4282* (2013.01); *G06F 2213/0042* (2013.01)

(58) Field of Classification Search
CPC .... G06F 13/385; G06F 13/4282; G06F 13/28; G06F 13/405; G06F 2213/0042; G06F 13/4027; G06F 13/4295
See application file for complete search history.

(56) References Cited

U.S. PATENT DOCUMENTS

| 7,478,191 B2 | 1/2009 | Wurzburg et al. |
| 2004/0148451 A1 | 7/2004 | Lai et al. |
| 2006/0206650 A1* | 9/2006 | Chang ............. G06F 13/4027 710/306 |
| 2010/0100652 A1* | 4/2010 | Lin .................. G06F 3/023 710/73 |

(Continued)

FOREIGN PATENT DOCUMENTS

| CN | 206479975 U | 9/2017 |
| CN | 109522257 A | 3/2019 |
| TW | I647571 B | 1/2019 |

*Primary Examiner* — Idriss N Alrobaye
*Assistant Examiner* — Ronald T Modo
(74) *Attorney, Agent, or Firm* — Rabin & Berdo, P.C.

(57) ABSTRACT

A host-to-host chip includes: first and second ports coupled to first and second hosts respectively; and a host-to-host control circuit coupled to the first port and the second port. When the host-to-host chip is coupled to the second host, the host-to-host control circuit identifies whether the second host is an i-Phone or an Android smartphone. If the host-to-host control circuit identifies that the second host is an i-Phone smartphone, in response to a command from the host-to-host control circuit, the second host switches to host role from device role, and the host-to-host control circuit controls whether data is transmitted between the first host and the second host via a DMA path. If the host-to-host control circuit identifies that the second host is an Android smartphone, the host-to-host control circuit determines that data is transmitted between the first host and the second host in a pass-through mode.

6 Claims, 4 Drawing Sheets

(56) References Cited

U.S. PATENT DOCUMENTS

| | | | |
|---|---|---|---|
| 2015/0309953 A1* | 10/2015 | Steele | G06F 13/4022 |
| | | | 710/316 |
| 2016/0232122 A1 | 8/2016 | Margabandu et al. | |
| 2017/0308732 A1* | 10/2017 | Wang | G06F 3/0488 |
| 2020/0204008 A1* | 6/2020 | Shirsat | H02J 7/00036 |

* cited by examiner

USB HOST-TO-USB HOST CHIP

This application claims the benefit of Taiwan application Serial No. 108115596, filed May 6, 2019, the subject matter of which is incorporated herein by reference.

BACKGROUND OF THE INVENTION

Field of the Invention

The invention relates in general to a USB host-to-host chip.

Description of the Related Art

Conventionally, when a mobile device is connected to a host (such as a notebook computer, a personal computer or a car system) via USB link, the mobile device is regarded as a device (that is, a slave device).

However, as the mobile device (such as smartphone) is getting more and more popular and the hardware function is getting more and more powerful, the mobile device can switch to a host role from a device role. Thus, it has become a trend that data can be transmitted in both the host-to-device mode and the host-to-host mode. Therefore, it has become a prominent task for the industries to meet the users' need of data transmission in the host-to-host at a low cost.

SUMMARY OF THE INVENTION

According to an exemplary embodiment of the present invention, a host-to-host chip is provided. The host-to-host chip includes: a first port and a second port coupled to a first host and a second host respectively; and a host-to-host control circuit coupled to the first port and the second port. When the host-to-host chip is coupled to the second host, the host-to-host control circuit identifies whether the second host is an i-Phone or an Android smartphone. If the host-to-host control circuit identifies that the second host is an i-Phone smartphone, in response to a command from the host-to-host control circuit, the second host switches to a host role from a device role, and the host-to-host control circuit controls whether data is transmitted between the first host and the second host via a DMA path. If the host-to-host control circuit identifies that the second host is an Android smartphone, the host-to-host control circuit determines that data is transmitted between the first host and the second host in a pass-through mode.

The above and other aspects of the invention will become better understood with regards to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
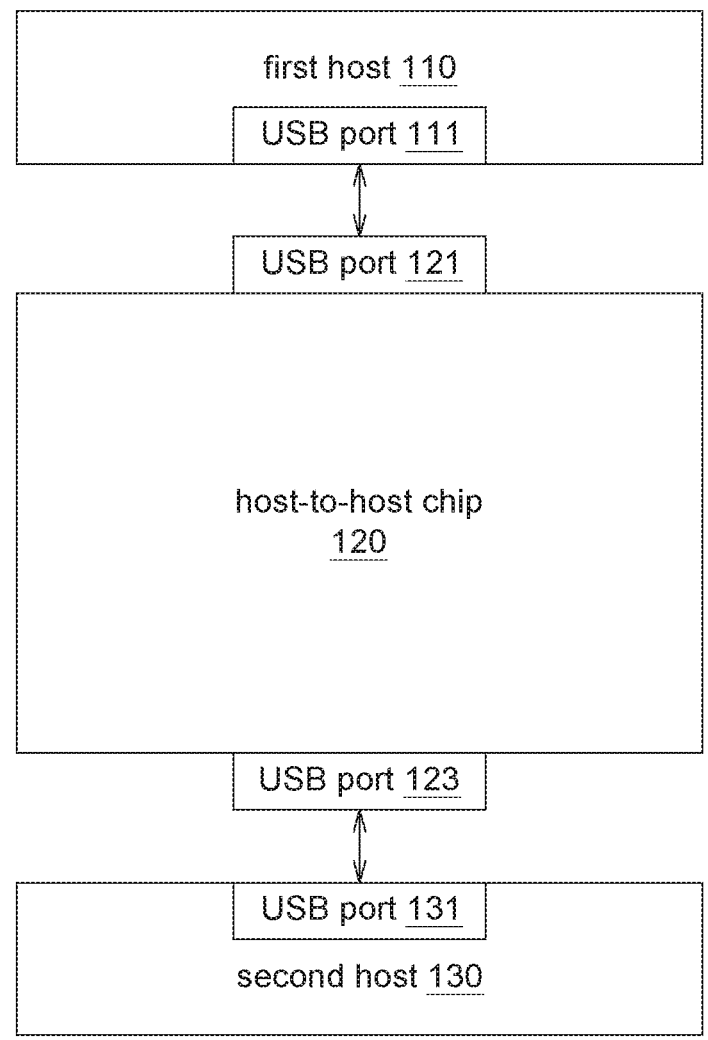
FIG. 1 is a system schematic diagram according to an exemplary embodiment of the invention.

FIG. 1 is a system schematic diagram according to an exemplary embodiment of the invention. As indicated in FIG. 1, the first host 110 can be realized, for example, an embedded system, a personal computer (PC), a notebook computer or a car system. During USB transmission, the first host 110 plays a host role. The second host 130 can be realized by, for example, an embedded system, or a smartphone. During USB transmission, the second host 130 plays a host role or a device role. That is, the second host 130 can switch between the host role and the device role, and the default role of the second host 130 is the device role.

The host-to-host chip 120 is coupled between the first host 110 and the second host 130. Particularly, the USB port 121 of the host-to-host chip 120 is coupled to the USB port 111 of the first host 110, and the USB port 123 of the host-to-host chip 120 is coupled to the USB port 131 of the second host 130. Additionally, the second host 130 supports the USB on-the-go (OTG) mode.

When the host-to-host chip 120 is coupled to the first host 110, the first host 110 plays the host role, and the host-to-host chip 120 plays the device role.

When the host-to-host chip 120 is coupled to the second host 130, in response to a command from the host-to-host chip 120, the second host 130 can switch between the host role and the device role. That is, when the second host 130 plays the host role, the host-to-host chip 120 plays the device role; or, when the second host 130 plays the device role, the host-to-host chip 120 plays the host role.

Figure 2:
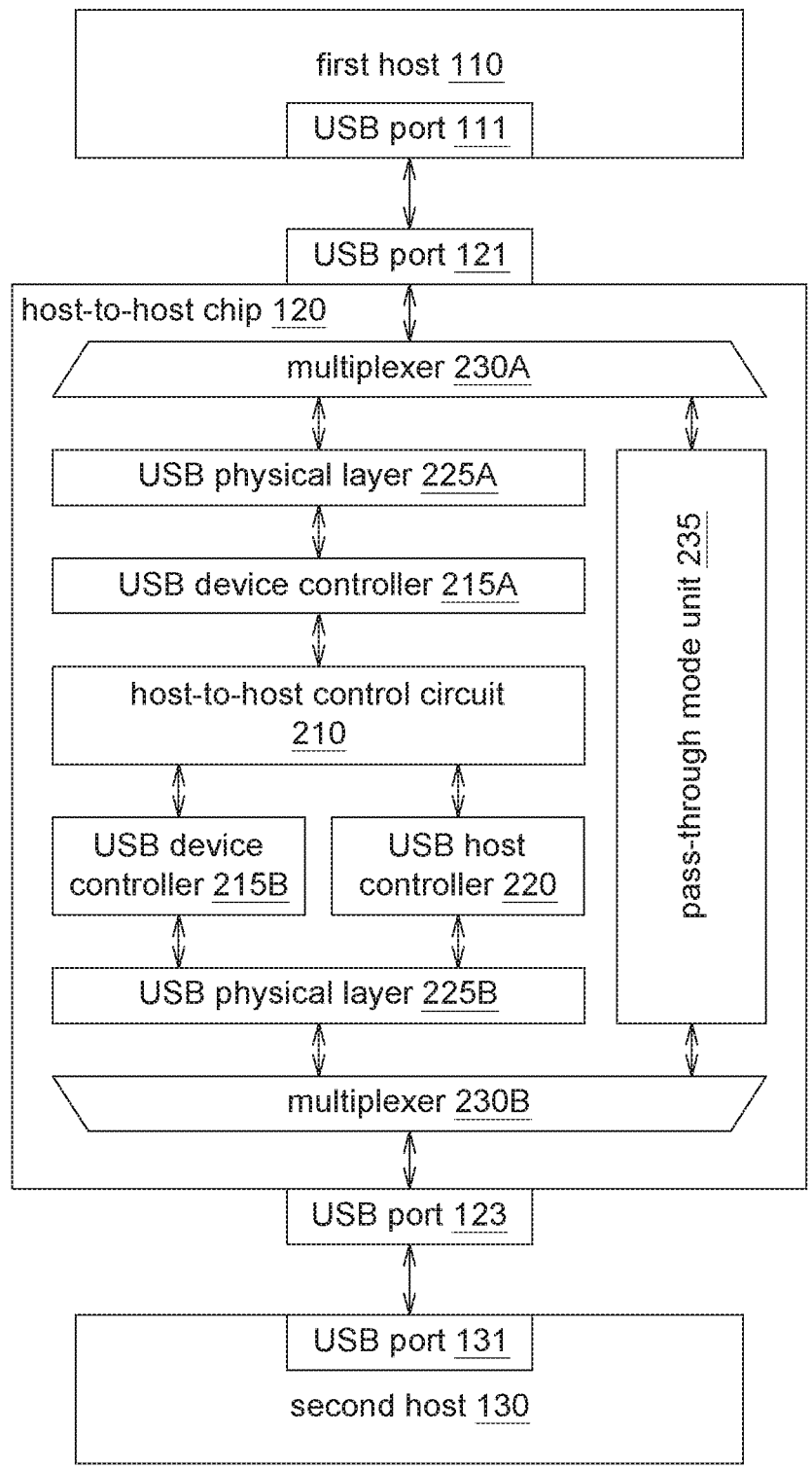
FIG. 2 is a function block diagram of a host-to-host chip according to an exemplary embodiment of the invention.

Referring to FIG. 2, a function block diagram of the host-to-host chip 120 according to an exemplary embodiment of the invention is shown. As indicated in FIG. 2, the host-to-host chip 120 includes: a host-to-host control circuit 210, USB device controllers 215A and 215B, a USB host controller 220, USB physical layers 225A and 225B, multiplexers 230A and 230B and a pass-through mode unit 235.

The host-to-host control circuit 210 is the main control circuit of the host-to-host chip 120.

When the first host 110 plays the host role, the USB device controller 215A interacts with the first host 110. That is, the host-to-host chip 120 can play the device role via function of the USB device controller 215A.

When the second host 130 plays the host role, the USB device controller 215B interacts with the second host 130 as a device role. That is, the host-to-host chip 120 plays the device role via the function of the USB device controller 215B.

When the second host 130 plays the device role, the USB host controller 220 interacts with the second host 130 as the host role. That is, the host-to-host chip 120 plays the host role via the function of the USB host controller 220.

The USB physical layer 225A is interposed between the USB device controller 215A and the multiplexer 230A. The USB physical layer 225B is interposed between the USB device controller 215B and the multiplexer 230A. The USB physical layer 225B is interposed between the USB host controller 220 and the multiplexer 230A.

The multiplexer 230A is controlled by the host-to-host control circuit 210 to selectively provide connection to the USB physical layer 225A or the pass-through mode unit 235, wherein, the data source and data target of the USB physical layer 225A is the USB physical layer 215A.

Likewise, the multiplexer 230B is controlled by the host-to-host control circuit 210 to selectively provide connection to the USB physical layer 225B or the pass-through mode unit 235, wherein, the data source and data target of the USB physical layer 225B is the USB device controller 215B or the USB host controller 220.

The pass-through mode unit 235 provides a pass-through connection between the second host 130 and the first host 110. That is, when the pass-through mode is selected (that is, the second host is an Android smartphone), the pass-through mode unit 235 provides a pass-through transmission path between the second host 130 and the first host 110; when the pass-through mode is selected (that is, the second host is an Android smartphone), the host-to-host control circuit 210 is not involved with data transmission between the second host 130 and the first host 110.

Figure 3:
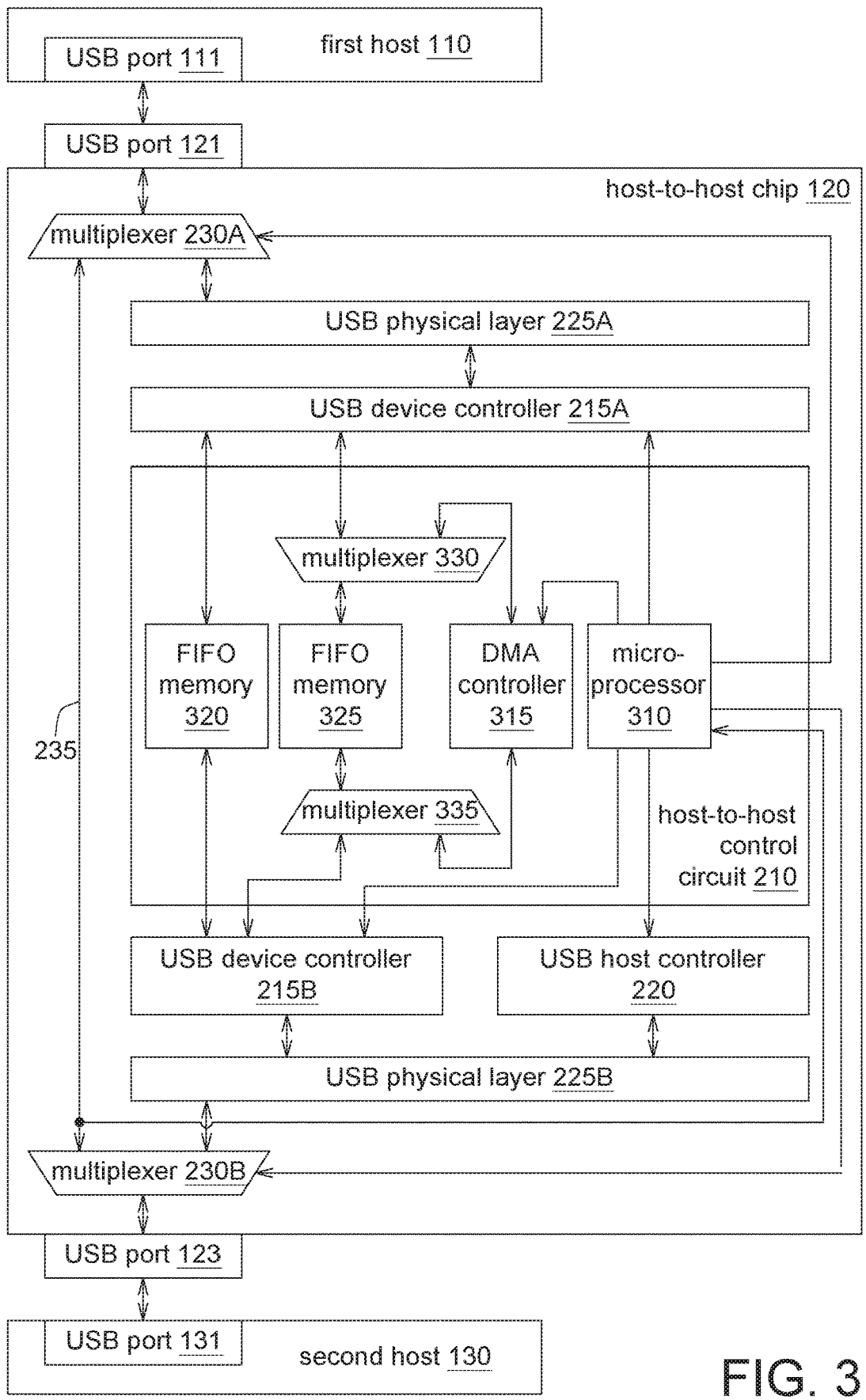
FIG. 3 is a detailed block diagram of a host-to-host control circuit according to an exemplary embodiment of the invention.

Referring to FIG. 3, a detailed block diagram of the host-to-host control circuit 210 according to an exemplary embodiment of the invention is shown. The host-to-host control circuit 210 includes: a micro-controller (MCU) 310, a direct memory access (DMA) controller 315, first-in-first-out (FIFO) memories 320 and 325 and multiplexers 330 and 335. Furthermore, the host-to-host control circuit 210 further provides an SD card reader function, an embedded multimedia card (eMMC) function, an audio function, an inter-integrated circuit (I2C) function, a serial peripheral interface (SPI), and a second host removal detection function.

The micro-controller 310 is configured to control the operations of the host-to-host control circuit 210.

The DMA controller 315, the FIFO memory 325 and the multiplexers 330 and 335 provide the DMA mode; or, the DMA controller 315, the FIFO memory 325, and the multiplexers 330 and 335 provide DMA paths and DMA functions. That is, when the DMA function is activated, data written to the FIFO memory 325 can be read and changed by the DMA controller 315 and then is stored to the FIFO memory 325. Details of the DMA are not disclosed here.

In FIG. 3, the pass-through mode unit 235 can be implemented by a signal line, but the invention is not limited thereto.

Referring to FIG. 2 and FIG. 3, operations of the host-to-host chip 120 according to an exemplary embodiment of the invention are disclosed. In the following disclosure, the host-to-host chip 120 is exemplarily coupled to the first host 110 (that is, the first host 110 plays the host role, and the host-to-host chip 120 plays the device role) and the second host 130 is exemplified by a smartphone.

When the second host 130 is initially connected to the host-to-host chip 120, the second host 130 plays the device role (that is, the default role), and the host-to-host chip 120 plays the host role (that is, the USB host controller 220 interacts with the second host 130, and the MCU 310 controls the multiplexer 230B and allows the USB host controller 220 to communicate with the second host 130). When the second host 130 is an i-Phone smartphone, the MCU 310 can control data transmission between the first host 110 and the second host 130 via the FIFO memory 320 (that is, the DMA function is not activated), or via the DMA controller 315, the FIFO memory 325, and the multiplexers 330 and 335 (that is, the DMA mode is activated). That is, if the host-to-host control circuit 120 identifies that the second host 130 is an i-Phone smartphone, in response to a command from the host-to-host control circuit 120, the second host 130 switches to the host role from the device role, and the host-to-host control circuit 120 controls whether data is transmitted between the first host 110 and the second host 130 via the DMA path.

If the host-to-host control circuit 120 identifies that the second host 130 is an Android smartphone, the host-to-host control circuit 120 determines that data is transmitted between the first host 110 and the second host 130 in a pass-through mode (that is, data is transmitted via the pass-through mode unit 235).

In an exemplary embodiment of the invention, the host-to-host control circuit 210 (that is, the MCU 310) can identify whether the second host 130 is an i-Phone or an Android smartphone according to the exchange of information between the host-to-host chip 120 and the second host 130.

When the second host 130 needs to switch its role, the host-to-host control circuit 210 can send a command to the second host 130 to switch the second host 130 to the host role from the device role. When the second host 130 needs to switch its role, the MCU 310 controls the multiplexer 230B to be temporarily disconnected from the second host 130.

When the host-to-host control circuit 210 (that is, the MCU 310) identifies that the second host 130 is an i-Phone smartphone, the MCU 310 causes the multiplexer 230B to switch to receive a signal from the USB physical layer 225B (or transmit a signal to the USB physical layer 225B). The multiplexer 230B is configured to switch to the pass-through mode unit 235 or the USB physical layer 225B. In an embodiment of the invention, the USB host controller 220 and the USB device controller 215B cause the second host 130 to switch between the device role and the host role. Moreover, when the second host 130 plays the host role, the MCU 310 can control data transmission between the first host 110 and the second host 130 via the FIFO memory 320 (that is, the DMA function is not activated), or via the DMA controller 315, the FIFO memory 325 and the multiplexers 330 and 335 (that is, the DMA mode is activated). In other words, the FIFO memory 320 forms a non-DMA path; and the DMA controller 315, the FIFO memory 325 and the multiplexers 330 and 335 form a DMA path.

When the host-to-host control circuit 210 (that is, the MCU 310) identifies that the second host 130 is an Android smartphone, the MCU 310 determines that data is transmitted between the first host 110 and the second host 130 at a pass-through mode. That is, the MCU 310 controls the multiplexers 230A and 230B to transmit a signal via the pass-through mode unit 235. That is, the data path between the second host 130 and the first host 110 is: the multiplexer 230A, the pass-through mode unit 235 (that is, signal line) and the multiplexer 230B. Data transmission between the second host 130 and the first host 110 is not performed via the interior of the host-to-host control circuit 210.

In an exemplary embodiment of the invention, the MCU 310 further has a detection function for detection whether the second host is removed or not. That is, when the first host 110 and the second host 130 interact and transmit data with each other in the pass-through mode, if the second host 130 still exists, the pass-through mode unit 235 (that is, the signal line) will have a USB data signal. In the pass-through mode, the MCU 310 can monitor whether the USB data signal still exists on the pass-through mode unit 235 (that is, the signal line). In the pass-through mode, if the MCU 310 finds that the USB data signal does not exist on the pass-through mode unit 235 (that is, the signal line), the MCU 310 can perform a corresponding reaction mechanism. For example, the MCU 310 can inform the first host 110 that the second host 130 no more exists, and cause the first host 110 to perform a corresponding reaction mechanism.

Figure 4:
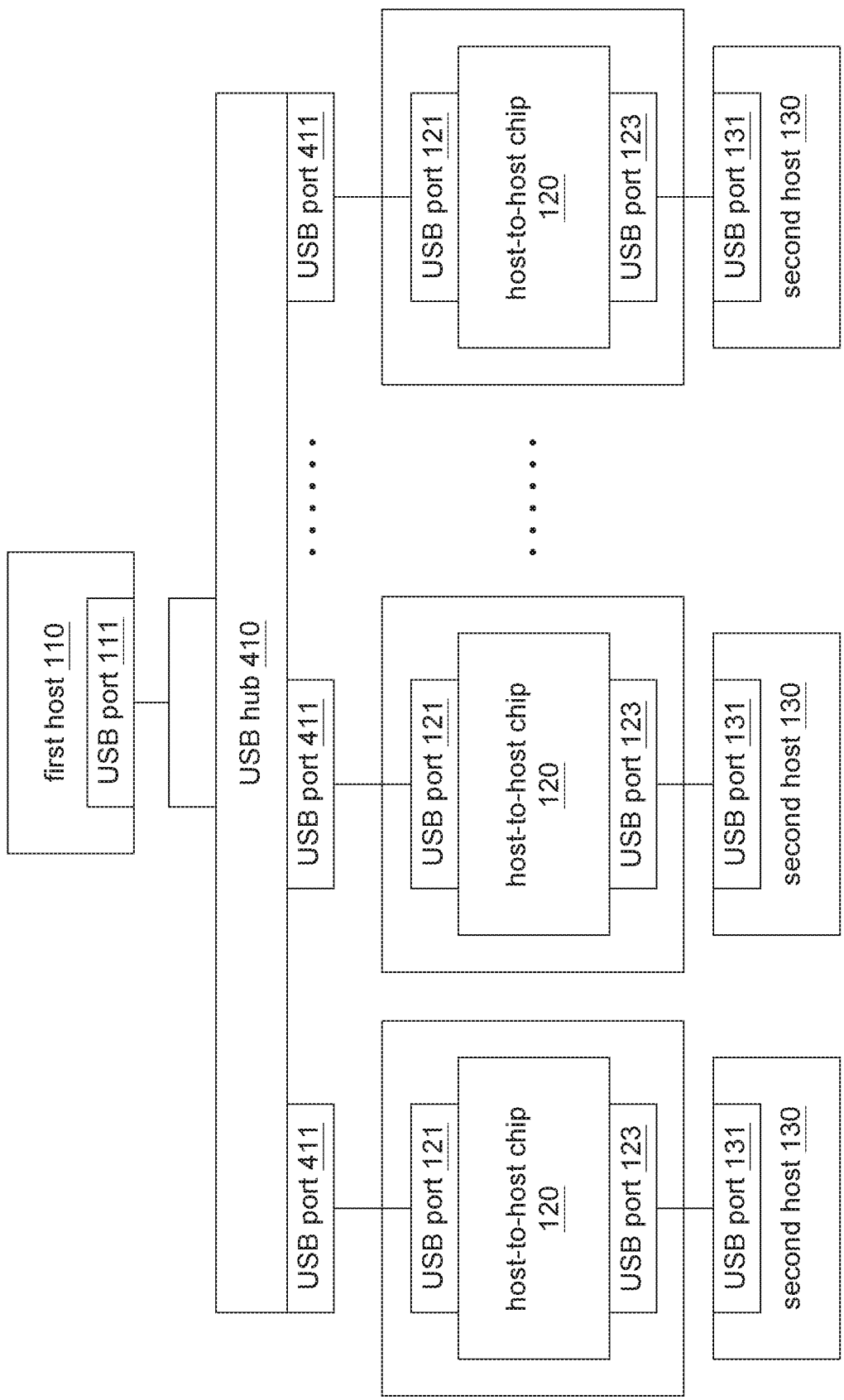
FIG. 4 is a system schematic diagram according to another exemplary embodiment of the invention.

FIG. 4 is a system schematic diagram according to another exemplary embodiment of the invention. As indicated in FIG. 4, for the first host 110 to be coupled to pleural second hosts 130, the first host 110 is coupled to the USB hub 410. The operations of the USB hub 410 are similar to that of a conventional USB hub, and are not repeated here. The USB hub 410 has pleural USB ports 411 respectively coupled to one or more than one host-to-host chip 120, which can further be coupled to a corresponding second host 130. The operating principles of FIG. 4 can be obtained from FIG. 2 and FIG. 3, and are not repeated here.

In an embodiment of the invention, the original functions of the USB hub are integrated to the host-to-host chip 120, so that the cost can be reduced and the advantage of product differentiation can be achieved.

In an embodiment of the invention, with the popularity of USB, the invention can provide a composite USB host-to-host chip. The USB host-to-host chip can identify the operating system of the smartphone (supporting the USB OTG mode) connected to the USB host-to-host chip by use of an identification mechanism, and automatically switches to a host-to-host mode (when the smartphone is an i-Phone smartphone) or a pass-through mode (when smartphone is an Android smartphone).

In an embodiment of the invention, under the circumstances that physical USB hub is not required, the host-to-host chip 120 can support automatic switch between the host-to-device mode and the host-to-host mode.

In an embodiment of the invention, the USB port 121 of the host-to-host chip 120 does not have to be inserted to the USB port 111 of the first host 110, and can send a vendor command according to the host control function.

Or, in another possible embodiment of the invention, after the USB port 121 of the host-to-host chip 120 is inserted to the USB port 111 of the first host 110, the host-to-host chip 120, after receiving the vendor command from the first host 110, can perform automatic switch between the host-to-device mode and the host-to-host mode.

According to the above embodiments of the invention, the host-to-host chip 120 (in the host role) can automatically identify the operating system of the second host 130 connected to the host-to-host chip 120. If the operating system of the second host 130 is an Apple iOS, the host-to-host chip 120 automatically switches to the device mode (the second host 130 switches to the host role from the device role). Thus, the first host 110 and the second host 130 both play the host role and cause the host-to-host chip 120 to provide a host-to-host transmission function, such that the second host 130, being an i-Phone smartphone, can successfully perform an Apple carplay function with the first host 110.

If the operating system of the second host 130 is an android system, the host-to-host chip 120 automatically switches to the pass-through mode, such that the second host 130, being an Android smartphone, can successfully perform an Android auto function with the first host 110.

In an embodiment of the invention, the host-to-host chip 120 can be implemented by a system on chip (SOC), and can therefore support the host-to-host mode and the host-to-device mode, such that the first host 110 can use the smartphone functions (such as the Apple carplay function and the Android auto function).

In an embodiment of the invention, the host-to-host chip is a composite USB bridge circuit, which can be connected to a USB OTG device (such as a smartphone). The host-to-host chip can communicate with the USB OTG device in the device mode or the host mode.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A host-to-host chip couplable to a first host and a second host, the host-to-host chip comprising:
   a first port and a second port coupled to the first host and the second host respectively; and
   a host-to-host control circuit coupled to the first port and the second port, wherein, when the host-to-host chip is coupled to the second host, the host-to-host control circuit identifies whether the second host is a first type of smartphone or a second type of smartphone;
   when the host-to-host control circuit identifies that the second host is the first type of smartphone, in response to a command from the host-to-host control circuit, the second host switches to a host role from a device role, and the host-to-host control circuit controls whether data is transmitted between the first host and the second host via a DMA path;
   when the host-to-host control circuit identifies that the second host is the second type of smartphone, the host-to-host control circuit determines that data is transmitted between the first host and the second host in a pass-through mode.

2. The host-to-host chip according to claim 1, further comprising:
   a first USB device controller coupled to the host-to-host control circuit, wherein when the first host plays the host role, the first USB device controller interacts with the first host, and the host-to-host chip plays the device role via first USB device controller; and
   a second USB device controller coupled to the host-to-host control circuit, wherein when the second host plays the host role, the second USB device controller interacts with the second host, and the host-to-host chip plays the device role via second USB device controller.

3. The host-to-host chip according to claim 2, further comprising:
   a USB host controller coupled to the host-to-host control circuit, wherein when the second host plays the device role, the USB host controller interacts with the second host, and the host-to-host chip plays the host role via the USB host controller.

4. The host-to-host chip according to claim 3, further comprising:
   a pass-through mode unit configured to provide a data transmission path of the pass-through mode unit;
   a first multiplexer controlled by the host-to-host control circuit to selectively provide connection from one of the first host or the second host to the first USB device controller or the pass-through mode unit; and
   a second multiplexer controlled by the host-to-host control circuit to selectively provide connection from the other of the first host or the second host to the first USB device controller or the USB host controller or the pass-through mode unit.

5. The host-to-host chip according to claim 4, wherein, the host-to-host control circuit comprises:
- a micro-controller;
- a direct memory access controller, a first memory, and a third and a fourth multiplexer configured to form the DMA path, wherein the DMA path is controlled by the micro-controller to provide a DMA data transmission path among the first USB device controller, the second USB device controller and the USB host controller; and
- a second memory configured to form a non-DMA path, wherein the non-DMA path provides a non-DMA data transmission path among the first USB device controller, the second USB device controller and the USB host controller.

6. The host-to-host chip according to claim 5, wherein, the micro-controller further monitors the data transmission path in the pass-through mode to determine whether the second host has been removed.

* * * * *